March 14, 1950 V. F. SAGER 2,500,873

GUIDE FOR GROOVING PHONOGRAPH RECORD DISKS

Filed June 13, 1946

INVENTOR.
Victor F. Sager
BY
Munn, Liddy & Glaccum
Attorneys

Patented Mar. 14, 1950

2,500,873

UNITED STATES PATENT OFFICE 2,500,873

GUIDE FOR GROOVING PHONOGRAPH RECORD DISKS

Victor F. Sager, Missoula, Mont.

Application June 13, 1946, Serial No. 676,427

5 Claims. (Cl. 33—174)

This invention relates to a guide or template for grooving phonograph record disks.

It has been found that some new sound record disks are imperfect in that they have the automatic lead-in portion at the beginning and the lead-off portion at the end of the sound groove not cut deep enough for the pick-up arm to follow, and as a consequence the phonograph will not trip off.

The principal object of the present invention is the provision of a guide or template with which to overcome the above mentioned objection by enabling the accurate grooving of a sound record disk in such manner that the disk will function properly for the intended purposes.

A further object of the invention is the provision of a guide or template for grooving phonograph record disks which is of simple construction, easy to use and of substantial design.

The nature of the invention and its distinguishing features and advantages will appear when the following specification is read in conjunction with the accompanying drawing, in which.

Figure 1:
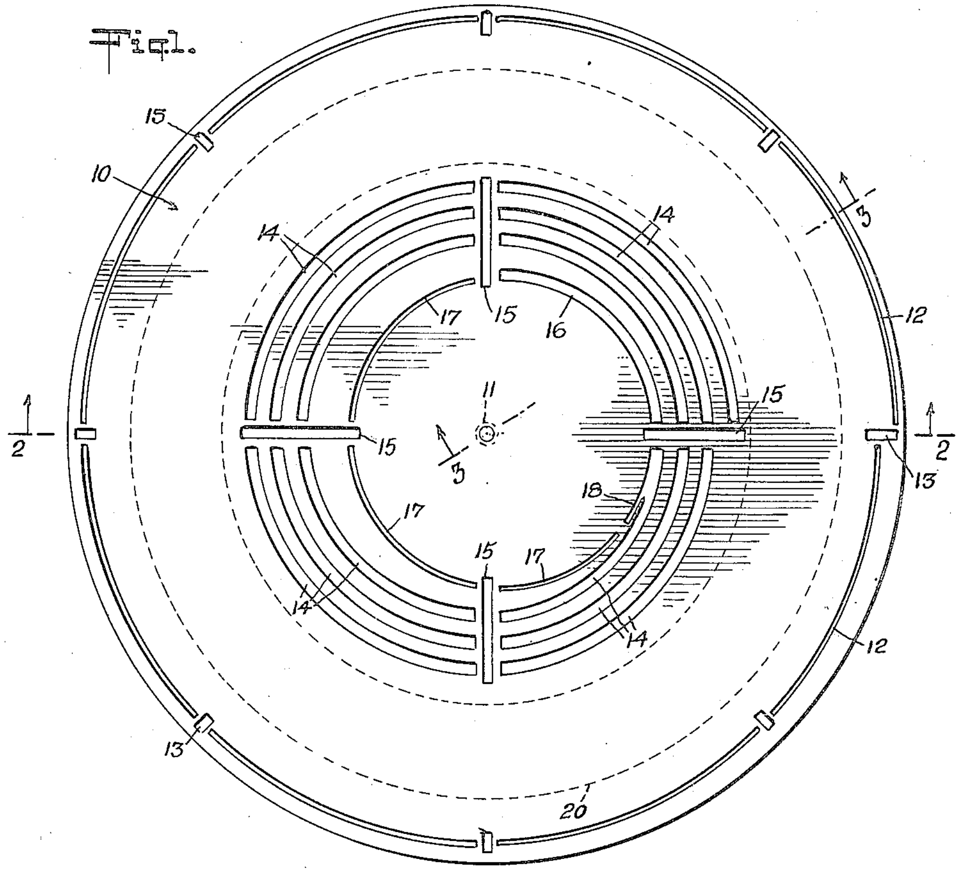
Fig. 1 is a top face view of a guide embodying the features of the present invention.

Referring now more particularly to the several views of the drawing, it will be seen that the guide or template consists of a circular plate or disk 10 made of any suitable material, preferably aluminum about three sixty-fourths of an inch in thickness. The overall diameter of the disk is nine and seven-eighths inches. The disk 10 has a projection or stud 11 secured thereto centrally thereof, at the back side. The projection is approximately five thirty-seconds of an inch high and of an outside diameter of nine thirty-seconds of an inch so as to fit snugly into the hole of a conventional sound record disk. The projection or stud 11 therefore serves as a means for properly locating the guide disk 10 resting flatwise on the sound record disk with reference to the sound record groove and the lead-in portion and lead-off portion thereof.

Starting near the periphery of the disk 10 are arcuate guide slots 12 in the disk adapted to receive and guide a suitable grooving tool having a sharp point. A phonograph needle held in a suitable handle will serve for cutting a record disk for the intended purposes. The slots 12, eight in number, are arranged end to end spaced apart with respect to each other and in spiral relation to the center of the disk 10. Radial sight openings 13 in the disk 10 occur between the ends of the slots 12. These slots are three sixty-fourths of an inch wide. The inner edge of each slot serves as the guiding edge for the grooving tool. The inner edge of the first or outermost slot 12 has a radius of four and fifty-three sixty-fourths inches. The radius of the remaining seven slots 12 decreases so that the end of the inner edge of the last slot 12 is five-sixteenths of an inch less than at the starting point of the inner edge of the first or outermost slot 12. The radial openings 13 are approximately one-eighth of an inch by one-fourth of an inch.

Near the center of the disk 10 are arcuate slots 14, there being four groups of these slots and three slots in each group. The slots 14 of each group are parallel to each other, or in other words, the slots 14 of each group are concentric with respect to each other, but they are eccentric with respect to the center of the disk 10. The group of slots 14 are spaced with respect to each other and radial sight openings 15 occur in the disk between the groups. The inner edge of each slot 14 serves as a guiding edge. Each slot 14 is approximately one-eight of an inch wide. The inner edge of the outermost slot 14 of the first group starts with a draft or radius of two and seven-eighths inches with a decrease in the radii of successive slots to a radius of one and three-fourths inches at the end of the inner edge of the last slot 14. An arcuate slot 16 lies in the zone of the first group of slots 14. This slot 16 together with arcuate slots 17 are arranged in a circle eccentric with respect to the center of the disk 10. The last slot 17 merges into the innermost slot 14 of the fourth group in a counter-clockwise direction, as at 18. The slots 17 are three sixty-fourths of an inch wide. The circle of slots 16 and 17 corresponds to the eccentric circular groove in the sound record disk serving as a guide for the phonograph needle to allow the pick-up arm of an automatic phonograph to swing back and forth for the purpose of actuating the cut-off and changer mechanism.

Figure 2:
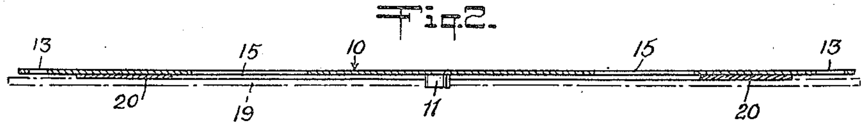
Fig. 2 is a sectional view taken on the line 2—2 of Fig. 1.
Figure 3:
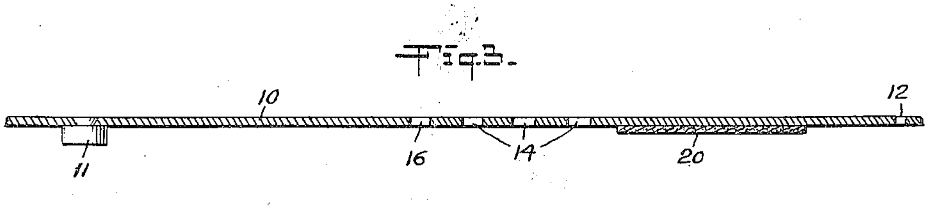
Fig. 3 is an enlarged sectional view taken on the line 3—3 of Fig. 1.

The provision and arrangement of all of the slots enable the grooving of an imperfect ten inch record disk regardless of the length of the sound groove therein. The lead-in portion of such sound groove which may not be cut deep enough may be recut by selecting the proper slot 12. The openings 13 enable the user to readily find the faulty portion of the sound groove. Likewise the slots 14 enable the recutting or grooving of the record disk to form an operative lead-off portion of the sound groove. These slots 14 are relatively wide to enable the user to see the sound groove. The radial openings 15 also serve for this purpose. By spacing the slots in the disk 10 it will remain intact. The material of the disk intervening the slots at their ends presents no interference in carrying out a guided grooving operation, since the disk 10 may be turned with respect to the record disk with the stud 11 serving as an arbor. The record disk is shown in dot and dash lines in Fig. 2 and is designated 19.

In order to prevent unintentional turning of the guide or template 10 upon the record disk 19, there is provided on the back side of the disk 10 anti-slipping means consisting of a circular piece of cloth 20 pasted to the disk 10. The cloth besides preventing the disk 10 from slipping while grooves are being cut in the disk 19 also tends to keep the disk 10 separated somewhat from the disk 19 so that small particles will not scratch the record.

I claim:

1. A guide for grooving a phonograph record disk comprising a plate adapted to rest flatwise on said disk, said plate having arcuate guide slots therein to receive and guide a suitable grooving tool, said slots being spaced in end to end relation with respect to each other and in spiral relation to the center of said plate to correspond to the record groove in said disk.

2. A guide for grooving a phonograph record disk comprising a flat plate adapted to rest flatwise on said disk, said plate having arcuate guide slots therein to receive and guide a suitable grooving tool, said slots being of a spiral draft with respect to the center of the plate, the starting end of one of said slots being near the outer edge of said plate.

3. A guide as set forth in claim 2, wherein certain of said slots are ending slots concentric to each other and eccentric to the center of said plate.

4. A guide as set forth in claim 1, and a projection on the plate at the center of the underside thereof.

5. A guide for grooving a phonograph disk as set forth in claim 1, wherein said plate has sight openings therein extending radially of the plate between the adjacent ends of said slots for scanning the disk preparatory to the use of the grooving tool.

VICTOR F. SAGER.

REFERENCES CITED

The following references are of record in the file of this patent:

UNITED STATES PATENTS

| Number | Name | Date |
|---|---|---|
| 323,272 | Buchanan | July 28, 1885 |
| 864,396 | Weston | Aug. 27, 1907 |
| 1,342,872 | Sandell | June 8, 1920 |
| 1,369,470 | Rian | Feb. 22, 1921 |
| 1,723,517 | McFadden | Aug. 6, 1929 |

FOREIGN PATENTS

| Number | Country | Date |
|---|---|---|
| 8,318 | Great Britain | of 1912 |
| 268,272 | Germany | Dec. 12, 1913 |

OTHER REFERENCES

Rapidesign Ellipse shown in Tool and Die Journal, January 1945.